United States Patent

Deidewig et al.

[11] Patent Number: 6,035,850
[45] Date of Patent: Mar. 14, 2000

[54] CONCENTRATOR FOR FOCUSING SOLAR RADIATION

[75] Inventors: Frank Deidewig, Köln; Manfred Boehmer, Lohmar; Peter Rietbrock, Köln, all of Germany

[73] Assignee: Deutsches Zentrum fuer Luft- und Raumfahrt e.V., Bonn, Germany

[21] Appl. No.: 09/222,824

[22] Filed: Dec. 30, 1998

[30] Foreign Application Priority Data

Jan. 14, 1998 [DE] Germany .......................... 198 01 078

[51] Int. Cl.$^7$ ..................................................... F24J 2/10
[52] U.S. Cl. .......................... 126/696; 126/692; 126/684; 126/680; 126/681; 126/683
[58] Field of Search ..................................... 126/696, 692, 126/684, 680, 681, 683

[56] References Cited

U.S. PATENT DOCUMENTS

| | | | |
|---|---|---|---|
| 4,135,493 | 1/1979 | Kennedy | 126/696 |
| 4,243,019 | 1/1981 | Severson | 126/634 |
| 4,435,043 | 3/1984 | Mertens et al. | 359/853 |

*Primary Examiner*—Larry Jones
*Attorney, Agent, or Firm*—Diller, Ramik & Wight, PC

[57] ABSTRACT

A concentrator for focusing solar radiation onto an elongate absorber, comprising a plurality of transverse supports arranged one behind the other in the longitudinal direction, stabilizing the concentrator in the transverse direction and defining the shape of the concentrator profile, and a thin-walled support structure resting on said transverse supports and having a plurality of adjacent longitudinally extending ribs stabilizing the concentrator in the longitudinal direction. In the transverse direction, the support structure adapts to the curved profile of the transverse supports and forms a lightweight and strong bearing for a reflector plate.

13 Claims, 2 Drawing Sheets

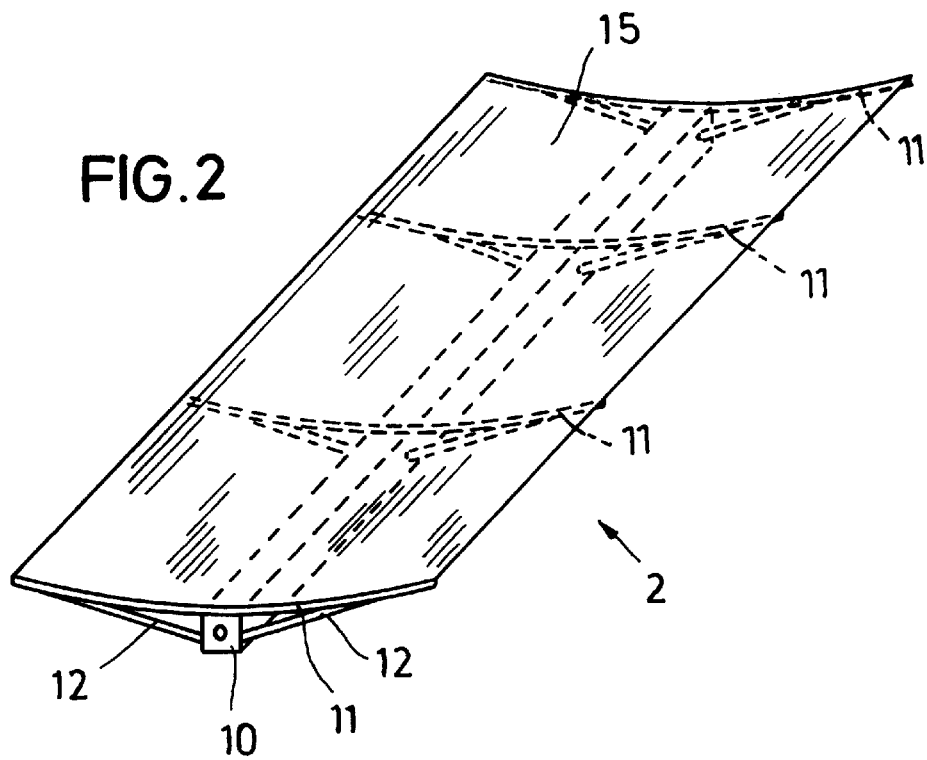
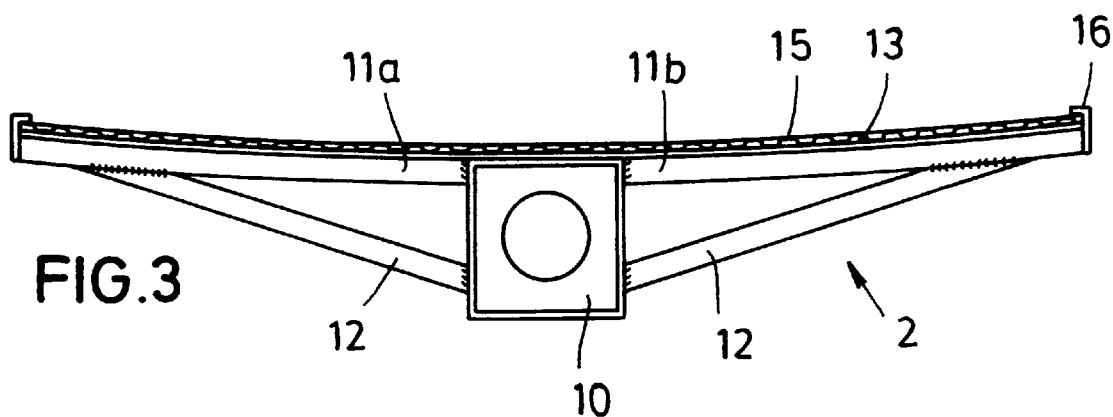
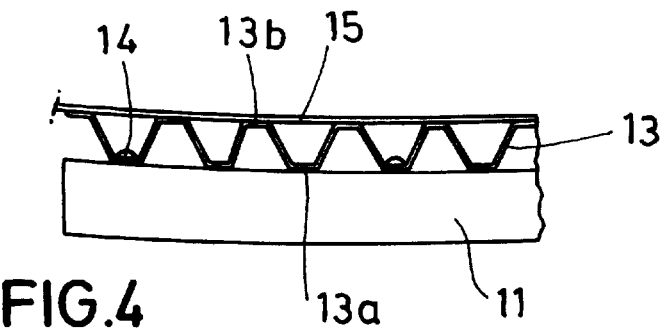

6,035,850

CONCENTRATOR FOR FOCUSING SOLAR RADIATION

BACKGROUND ART

The present invention relates to a concentrator for focusing solar radiation onto an elongate absorber such as in a solar-thermal power plant, for example.

Solar collectors often use trough systems. Such systems comprise an elongate through-shaped concentrator that usually has a parabolic cross section. The absorber, through which a heat transfer medium circulates, is of tubular shape and is arranged in the focal line of the concentrator. The reflectors of these concentrators are most often made of self-supporting composite glass silvered on the rear surface. At a thickness of 6 to 8 mm, these glass mirrors are rather heavy which becomes evident in particular with great aperture widths that extend to up to 6 m. Due to the self-supporting properties of the composite glass, the support structures for these reflectors merely have to support the weight of the reflectors. A shaping support of the reflectors is not necessary in this case.

In the past, efforts were made to simplify the structure of parabolic trough-shaped concentrators so as to lower the costs of a plant. For example, sheets and other thin-layer mirrors, such as anodized aluminum sheets or polymeric films, have been used for reflectors. Compared to composite glass, this entailed a significant reduction in weight. It is a disadvantage, however, that these thin-layer mirrors do not have the self-supporting properties of composite glass. Therefore, sophisticated support structures are required that support the thin-layer mirrors such that they are maintained in a parabolic shape. Additionally, the width of the aperture has to be increased when using these thin-layer mirrors, since the reflection of solar radiation is somewhat less for aluminum sheets and films than for silver-coated optical glasses. The large aperture widths of these concentrators offer a large area of attack to wind so that strong support structures are required. However, known support structures of aluminum or steel are very complicated and heavy, which makes them correspondingly expensive. U.S. Pat. No. 4,243, 019 that forms the precharacterizing part of claim 1, describes a trough-shaped solar concentrator comprising two side members between which a corrugated support element extends in the longitudinal direction, a reflective surface being attached on the support element. Struts are fastened to the transverse faces of the side members, the struts being connected with a receptacle surrounding an absorber pipe. The receptacle is mounted for rotation on a stand so that the entire concentrator may be moved to track the course of the sun. Since the axis of rotation of the concentrator, which coincides with the axis of the absorber pipe, is disposed far above the supporting structure of the concentrator, a sophisticated stand structure is necessary and a great torque has to be applied to make the concentrator track the course of the sun.

It is another problem of large aperture widths that the distances between the individual troughs have to be rather great so that no shadows are cast in the morning and in the evening (given a north-to-south orientation). For a more effective exploitation of the given surface areas and for a reduction of the wind stresses, trough-shaped concentrators of facet structure have been proposed. With such a facet structure, the concentrator is divided into a plurality of segments arranged side-by-side on one level. These segments track the sun individually so that the solar radiation reflected by this segment is always concentrated onto the absorber. Also with the facet structure, the design of the support structure for the reflector poses some problems, because the support structure has to shape the reflector while being rigid at the same time to prevent torsion in the reflector. Prior support structures are of complicated design and are heavy, increasing the costs of a solar power plant.

SUMMARY OF THE INVENTION

It is an object of the present invention to provide a light-weight and strong concentrator for focusing solar radiation.

The concentrator of the present invention has an elongate shape with a continuous longitudinal support on which a plurality of transverse supports are arranged sequentially in the longitudinal direction, the transverse supports providing the concentrator with stability in the longitudinal direction. Further, a thin-walled support structure is provided resting on the transverse supports and comprising a plurality of abutting longitudinally extending ribs having a stabilizing effect in the longitudinal direction. A reflector plate focusing the solar radiation onto an absorber rests on this support structure. By separating the longitudinal and transverse stabilization, the transversely flexible and longitudinally rigid support structure allows for an optimum adaptation of the support structure and, thus, of the reflector plate resting on the support structure, to the required cross section of the concentrator. Further, the combination of a few transverse supports on a longitudinal support and a light-weight longitudinally extending support structure makes it possible to keep the weight of the structure of the concentrator very low without any losses in stability. A complicated substructure for the concentrator can therefore be omitted. Due to its low weight and its great stability, the present concentrator resists deformation caused by weight forces or wind stresses and by the tracking, respectively. The present concentrator allows for optional concentrator cross sections to be realized. The curvature is determined by the transverse supports, the transversely flexible support structure and, thus, the reflector plate resting thereon, adapting to this curvature. Therefore, this concentrator may be realized as a parabolic trough shape or as a facet shape. The rotational axis for making the concentrator track the course of the sun is disposed within the longitudinal support, which is advantageous in that, due to the central arrangement of the rotational axis, only low torques are needed to move the concentrator.

Preferably, the ribs of the support structure are trapezoidal in cross section. Thus, the top and bottom faces of the support structure have bearing faces. At the bottom bearing faces, the support structure may be fastened to the transverse supports by rivets or bolts, for example, while the reflector plate rests on the top bearing surface or is glued thereto, for example. If the reflector plate just rests on the support, a retaining means engages over the lateral edges thereof. This offers the advantage that the reflector plate may expand unrestrictedly in case of temperature variations, without any ensuing stresses or torsion therein.

DETAILED DESCRIPTION OF THE DRAWINGS

The following is a detailed description of an embodiment of the present invention with reference to the accompanying drawings.

In the Figures:

FIG. 2 is a perspective view of an individual concentrator,

FIG. 3 is a front view of the concentrator, and

FIG. 4 is a detail of the concentrator.

DETAILED DESCRIPTION OF A PREFERRED EMBODIMENT

Figure 1:
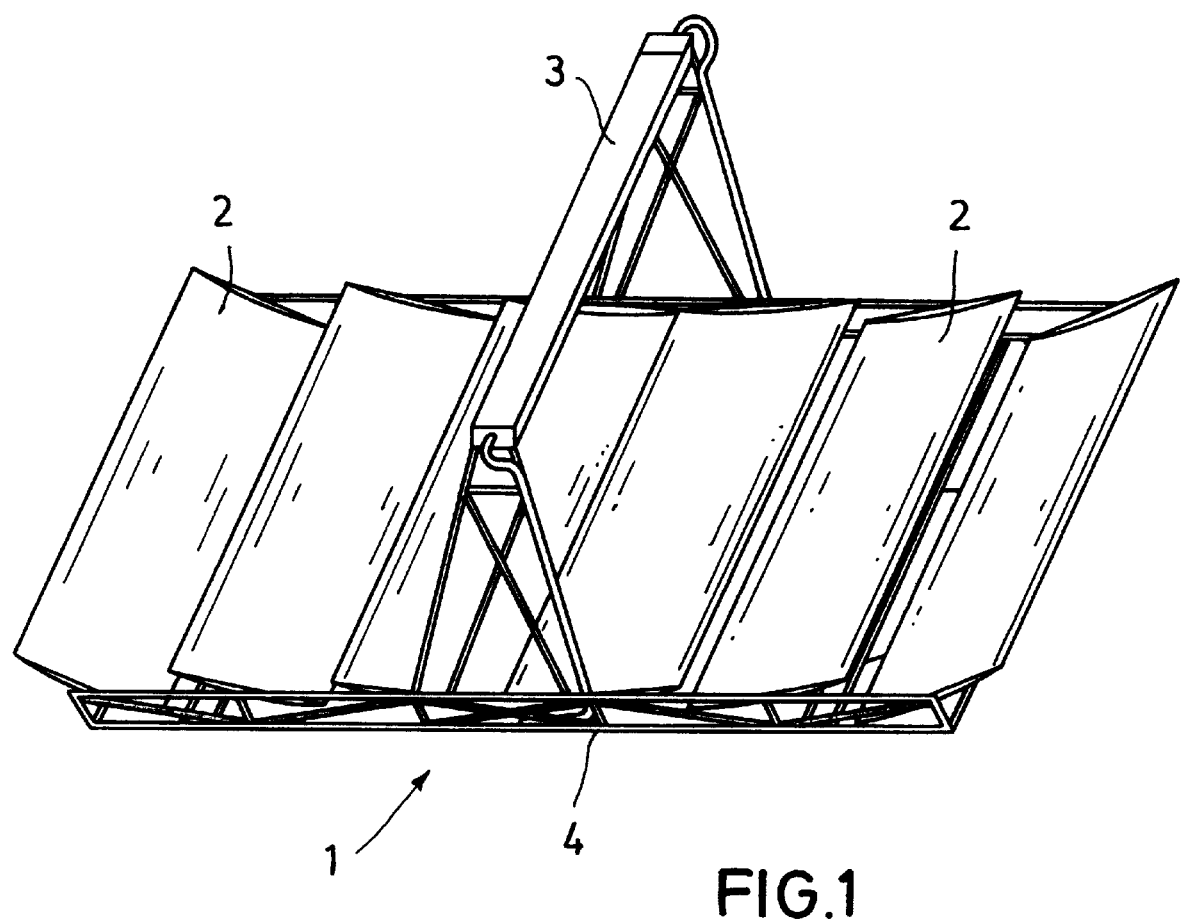
FIG. 1 is a perspective view of a concentrator realized as a facet structure.

FIG. 1 illustrates a solar power plant 1 of facet trough-shape design. A plurality of elongate concentrators 2 focus the incident solar radiation onto an absorber 3 through which a heat transfer medium flows. Each concentrator 2 is mounted for rotation on a substructure 4 so that they may track the course of the sun individually to focus a maximum amount of solar radiation onto the absorber 3.

The concentrator 2 illustrated in FIGS. 2 and 3 comprises a longitudinal support 10 extending in the longitudinal direction over the entire length of the concentrator 2, the support being designed at the same time to serve as a rotational axis for tracking the concentrator 2. The top of the longitudinal support 10 is provided with a plurality of curved transverse supports 11 disposed one behind the other in the longitudinal direction. The cross section of the transverse support 11 determines the trough cross section of the concentrator 2. Depending on the use of the concentrator, e. g. as a parabolic trough-shaped concentrator or as a comparatively flat concentrator in a facet trough, the curvature of the transverse support 11 varies. As illustrated in FIG. 2, the transverse support 11 may extend over the entire width or it may comprise two transverse support elements 1a, 11b provided on the sides of the longitudinal support 10, as shown in FIG. 3.

The transverse supports 11 are further supported at the longitudinal support 10 by struts 12. This assembly of the longitudinal support 10, the transverse supports 11 and the struts 12 is light-weight and very strong in the transverse direction. One could also increase the strength in the longitudinal direction by inserting further transverse supports 11 into the rather wide spaces between the existing transverse supports 11.

A lighter structure may be obtained with a support structure 13 illustrated in FIG. 4. The support structure 13 is made of a thin-walled, light-weight and strong material, such as sheet metal, and comprises a plurality of adjacent longitudinally extending ribs, each having a trapezoidal cross section. Therefore, the support structure 13 is very strong in the longitudinal direction, yet flexible in the transverse direction, whereby it adapts to the curvature of the transverse supports 11.

Bearing portions 13a of the support structure 13 rest on the transverse support 11. These bearing portions 13a are wide enough to receive the head of a screw or a rivet 14 connecting the support structure 13 with the transverse support 11. A reflector plate 15 rests on the top bearing portions 13b. The reflector plate 15 is made of anodized aluminum sheet or a film mirror, for example. The contour of the reflector plate 15 is determined through the curved transverse support 11 and the transversely flexible support structure 13 fastened thereon. The support structure 13 adapts exactly to the curvature of the transverse support 11 so that the plurality of the top bearing surfaces 13b forms an exact shape for the flexible reflector plate 15.

The reflector plate 15 may either be glued onto the top bearing surfaces 13b of the support structure 13 or it may merely be laid thereon. When the reflector plate 15 is merely laid onto the support structure, the lateral edges of the support structure 13 are provided with retaining means 16 that engage over the reflector plate 15 to ensure contact between the reflector plate 15 and the support structure 13.

The supporting elements, namely the longitudinal support 10, the transverse support 11 and the support structure 13, are arranged below the reflector plate 15 so that these members will not cast a shadow on the reflector plate 15.

Due to the light-weight structure of the concentrator 2, the same may be readily produced and transported even in large dimensions.

Although the present invention has been described with reference to a particular embodiment thereof, an expert in the field will readily find various possibilities for modifications and variations. These modifications and variations are covered by the present invention as defined by the accompanying claims.

What is claimed is:

1. A concentrator comprising a longitudinal support, a plurality of transverse supports arranged in substantially side-by-side longitudinally spaced relationship to each other, said longitudinal support being disposed substantially medially of each of said transverse supports, a thin-walled support structure spanning said transverse supports, said thin-walled support structure having a plurality of transversely adjacent longitudinally extending ribs, a reflector plate resting upon said support structure, said longitudinal support including means for defining a longitudinally extending pivot axis about which said concentrator can pivot, each of said transverse supports being defined by a pair of upper aligned support members each having a first end secured to said longitudinal support and a remote second end, each of said transverse supports being further defined by a pair of reinforcing struts each having a first end secured to one of said upper support member second ends and a second end secured to said longitudinal support, and each support member and its reinforcing strut setting-off an acute angle therebetween.

2. The concentrator as defined in claim 1 wherein said longitudinal support includes axially opposite end portions, at least one of said transverse supports is arranged at each of said longitudinal support end portions, and at least one further transverse support is arranged between said longitudinal support end portions.

3. The concentrator as defined in claim 1 wherein said ribs are substantially trapezoidal in transverse cross section.

4. The concentrator as defined in claim 1 wherein said ribs are substantially corrugated in transverse cross section.

5. The concentrator as defined in claim 1 wherein the transverse supports are of a substantially curved configuration.

6. The concentrator as defined in claim 1 wherein the transverse supports are of a substantially curved parabolic configuration.

7. The concentrator as defined in claim 1 wherein the transverse supports are of a substantially curved circular configuration.

8. The concentrator as defined in claim 1 wherein the reflector plate is constructed from thin sheet metal.

9. The concentrator as defined in claim 1 wherein the reflector plate is constructed from thin film.

10. The concentrator as defined in claim 2 wherein said ribs are substantially trapezoidal in transverse cross section.

11. The concentrator as defined in claim 2 wherein said ribs are substantially corrugated in transverse cross section.

12. The concentrator as defined in claim 2 wherein the transverse supports are of a substantially curved configuration.

13. The concentrator as defined in claim 2 wherein the transverse supports are of a substantially curved parabolic configuration.

* * * * *